A. PETERSON.
LOCOMOTIVE.
APPLICATION FILED APR. 1, 1912.

1,035,730.

Patented Aug. 13, 1912.
3 SHEETS—SHEET 1.

Witnesses
Frank R Glow
H.C. Rodgers

Inventor
Alfred Peterson
By George Y Thorpe Atty.

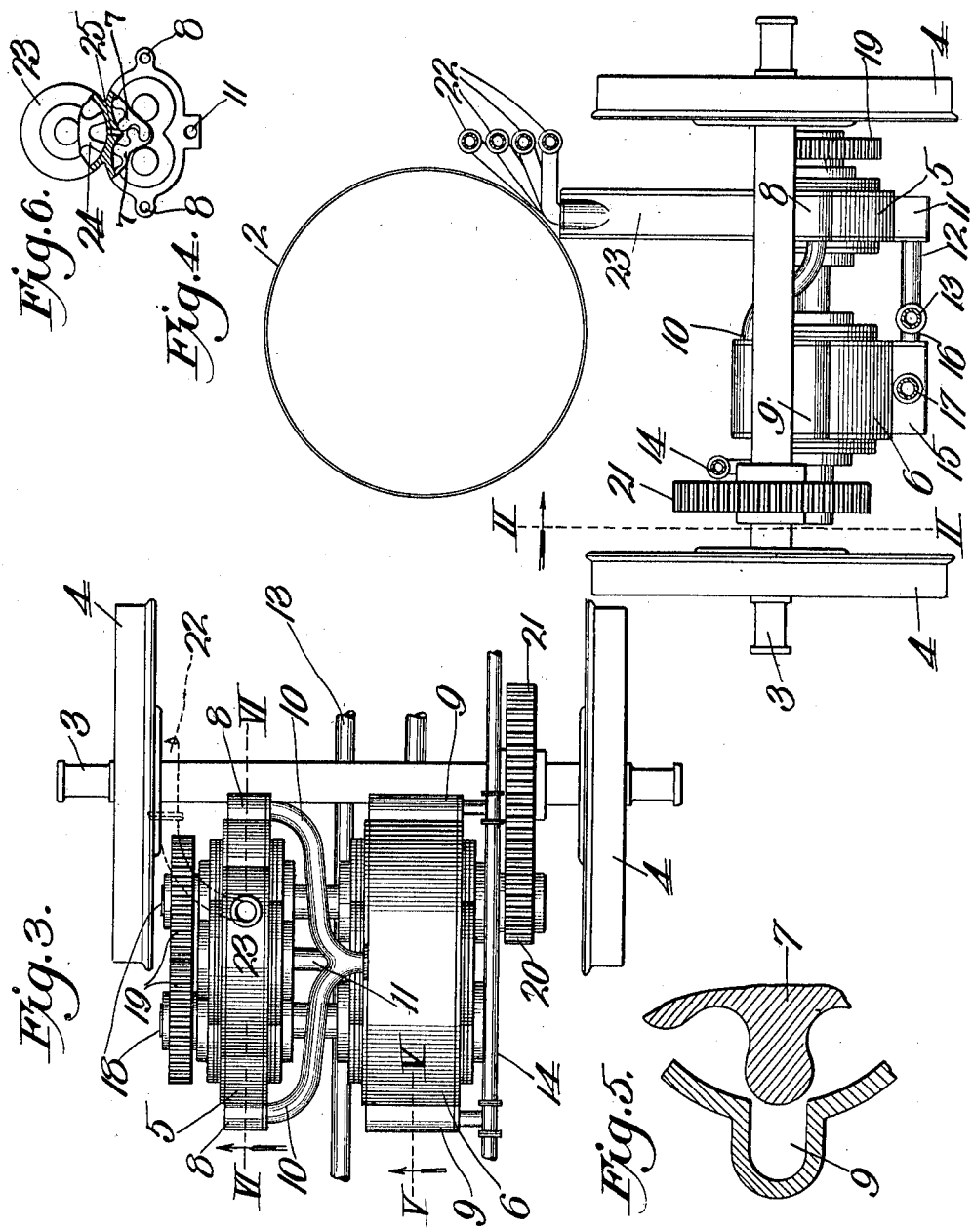

A. PETERSON.
LOCOMOTIVE.
APPLICATION FILED APR. 1, 1912.
1,035,730.
Patented Aug. 13, 1912.
3 SHEETS—SHEET 3.
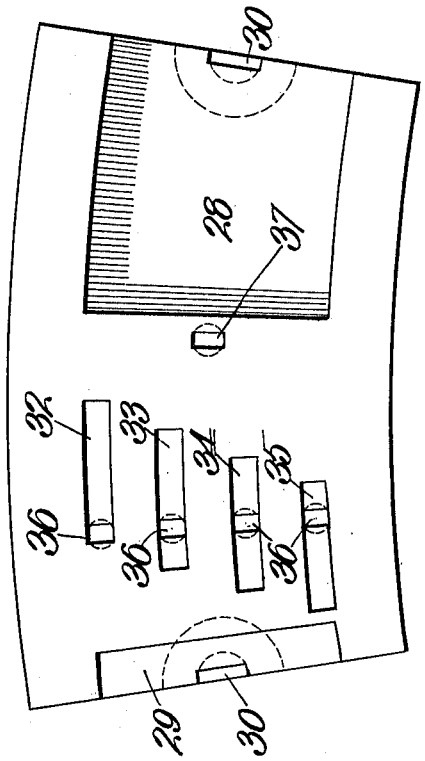
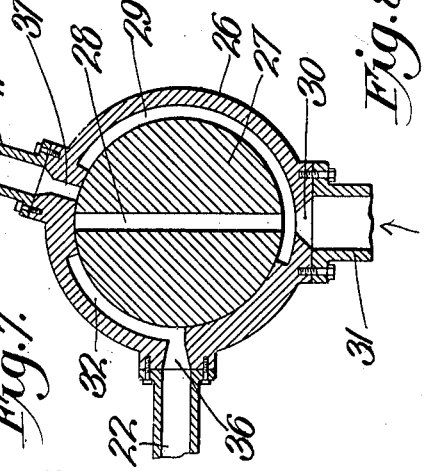
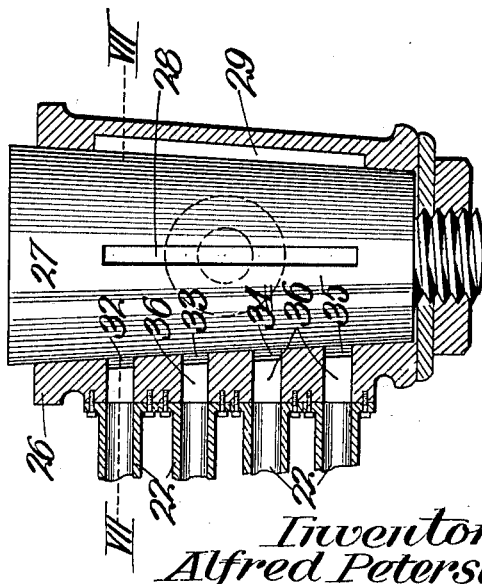
Witnesses
Frank R Glow
H.C. Rodgers
Inventor
Alfred Peterson
By George Y Thorpe Atty.

UNITED STATES PATENT OFFICE.

ALFRED PETERSON, OF INDEPENDENCE, MISSOURI.

LOCOMOTIVE.

1,035,730. Specification of Letters Patent. Patented Aug. 13, 1912.

Application filed April 1, 1912. Serial No. 687,720.

*To all whom it may concern:*

Be it known that I, ALFRED PETERSON, a citizen of the United States, residing at Independence, in the county of Jackson and State of Missouri, have invented certain new and useful Improvements in Locomotives, of which the following is a specification.

This invention, which relates to motor-driven vehicles, and especially locomotives, has for its object to provide in combination with the drivers of a vehicle, and which are arranged " fore and aft," or in other words, one in advance of the other, a plurality being employed, means whereby the drivers may be operated, either individually or collectively, or in other words, in which either one or more of said drivers may receive the impulse of the motive agent, and whereby all of the motors which are connected respectively with said drivers, are controlled from a common point or by a common instrumentality, such as a manually operated valve, and also to provide means whereby the application of the motive agent to each motor is so regulated as to utilize the expansive energy of said agent, and also to provide means whereby a backward or reverse movement may be imparted to the vehicle, such reversing means being under the control of the above noted manually operated instrumentality.

With these general objects in view and others of a tributary nature, the invention consists in certain novel and peculiar features of construction and organization as hereinafter described and claimed; and in order that it may be fully understood reference is to be had to the accompanying drawings illustrating one embodiment of the invention as applied to a locomotive, in which—

Figure 1:
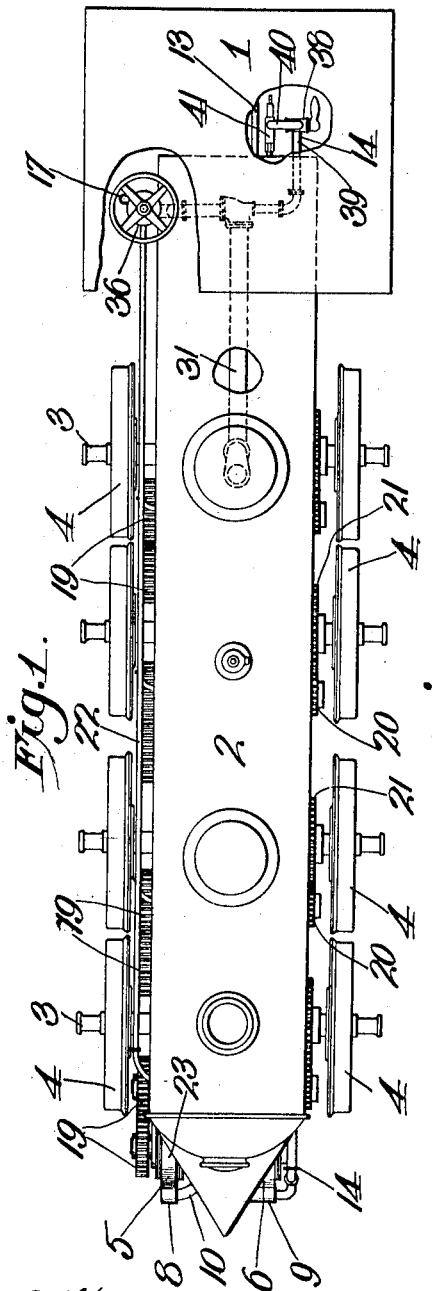
Figure 2:
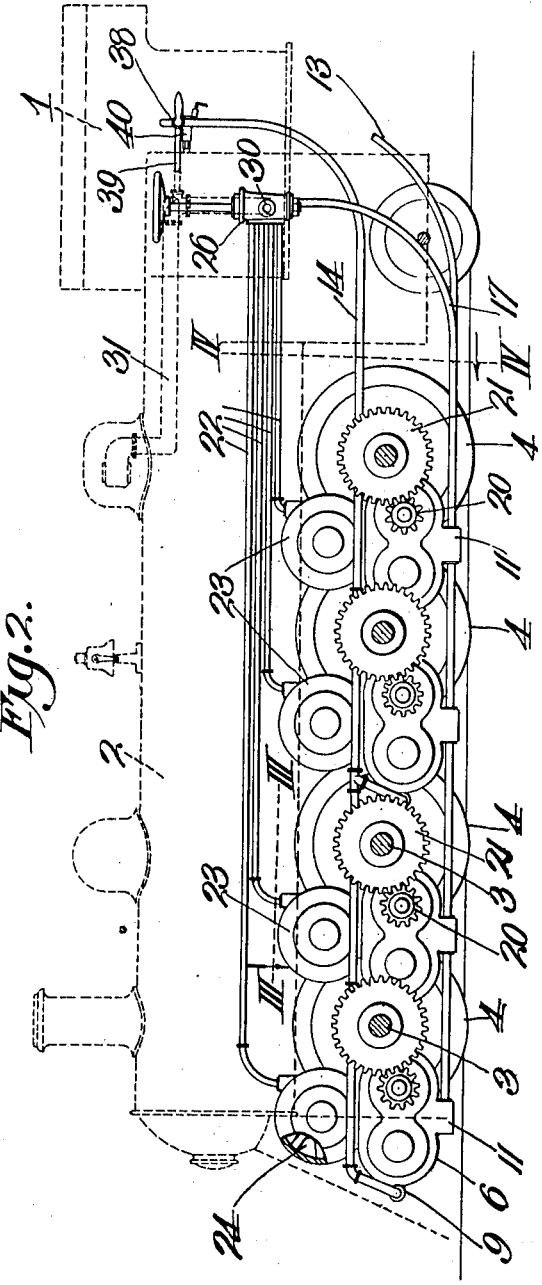

Figure 1, is a plan view of a locomotive embodying my invention. Fig. 2, is a section on the line II—II of Fig. 4. Fig. 3, is a horizontal section on line III—III of Fig. 2. Fig. 4, is a section on line IV—IV of Fig. 2. Fig. 5, is an enlarged detail section on line V—V of Fig. 3. Fig. 6, is a section on line VI—VI of Fig. 3. Fig. 7, is a section on line VII—VII of Fig. 8. Fig. 8, is a vertical central section of Fig. 7 with the plug of the valve in elevation. Fig. 9, is a diagram illustrating the relative positions of the various ports of the valve casing. Fig. 10, is a horizontal section of a part of an injector valve for the locomotive.

In the said drawings, 1 indicates the cab, 2 the boiler, 3 the shafts and 4 the driving wheels of a locomotive. To drive each shaft, I provide a suitably supported compound engine comprising a high pressure motor 5, and a low pressure motor 6, and as these motors are on the market and are embodied in Patent No. 926,846, issued July 6, 1909 to A. Brauer, a detailed drawing showing the construction thereof is omitted, only sufficient reference to the parts thereof being made herein for the purpose of clearly explaining the construction and operation of this locomotive. The cylinders of said motors each contain a pair of intermeshing peripherally-toothed pistons 7, and at opposite ends of the cylinders are discharge pockets 8 and 9 respectively, the pockets 8 of the high pressure cylinders being connected by pipes 10 to the low pressure cylinders, so that the steam at low pressure—that is after having operated the pistons of the high pressure cylinders shall enter the low pressure cylinders and drive the pistons thereof. That portion of the steam in the high pressure cylinders which passes pockets 8, will enter pockets 11 and pass thence through pipes 12 into an exhaust pipe 13, which may lead to pipes (not shown) for heating cars or to the stack to stimulate the draft. After the steam from pipes 10 has operated the pistons of the high pressure cylinders, some of it enters pockets 9 of said cylinders and passes thence into return pipe 14, from which it is injected, as hereinafter explained, back into the boiler. The remainder of the steam enters the low pressure cylinders and after operating the pistons thereof, enters pockets 15 and passes thence through pipe 16 into pipe 13.

17 is a pipe connected to the pockets 15, for conducting steam thereto as hereinafter explained for reversing the operation of the motors, which pipe when the locomotive is moving forward, is closed as hereinafter explained.

18 indicates the shafts for the pistons and 19 are intermeshing gear wheels on said shafts. One of the shafts of each motor carries a gear wheel 20 meshing with a larger gear 21, on the adjacent drive-wheel shaft 3.

22 indicates pipes for supplying the high pressure cylinders of the motors with steam at boiler pressure, and in the preferred construction, I equip each high pressure cylinder with a rotary valve which is driven under direct pressure of steam. Each of said valves consists of a cylinder 23 and a peripherally-toothed rotary valve 24 therein, and the said cylinders are connected at their lower ends by ports 25 to the top of the underlying low pressure motors 5. By this arrangement the teeth of the rotary valves 24 successively close and open ports 25 so as to supply steam intermittently to the motors 5, this intermittent supply of steam to said motors resulting in a saving of fuel because the steam supplied to motors is given time to expand and thus drive the pistons through expansion rather than direct pressure.

Referring now to the valve for supplying steam from the boiler to the pipes 22, or to the reverse pipe 17; 26 is a casing and 27 a plug valve therein, provided with a passage 28. The casing is provided in its inner side with a recess 29 constituting a passage connected at all times by a port 30 with a pipe 31 leading from the steam dome of the boiler, and is also provided with a series of recesses 32 and 33, 34 and 35, extending circumferentially and arranged in overlapping relation and each communicating with a port 36 and a pipe 22, the ports 36 standing in vertical alinement and communicating with the recesses 32 to 35 inclusive, at different points in the length thereof. The arrangement is such that when what may be termed the front end of recess 32 communicates with the plug passage 28, steam will pass into said recess and thence through the communicating port 36 into the connected pipe 22 leading to the foremost valve casing 23, to operate the rotary valve thereof and the motor connected thereto. When the valve plug is turned a little farther, passage 28 will also communicate with recess 33 so that steam will pass to the foremost and second motors. It may be turned still farther and establish communication with the third motor, and its full distance to establish communication with all of the motors.

By reversing the rotary adjustment of the multiple hand-operated valve described, it is obvious that the port 28 may be brought successively into communication with the recesses of the casing in reverse order, that is may be brought successively into communication with recesses 35 and 34 and 33 and 32. It will thus be seen that steam may be supplied to only the foremost or rearmost motor or to all of the motors at the same time. It will be apparent that when steam is supplied to any one or more of the pipes 22, the plug acts as a closure for the casing port 37 communicating with the reversing pipe 17.

If it is desired to reverse the engine, communication is established between the supply pipe 31 and the reversing pipe 17, by turning the plug 27 until its port 28 places passage 29 into communication with said port 37. By this arrangement the pistons of the motors are operated in the reverse direction as will be readily understood.

For reinjecting steam from pipe 14 back into the boiler, I provide the following construction: 38 is a valve casing with which communicates pipe 14 and a pipe 39 in communication with the steam chamber of the boiler, and said casing is provided with a discharge pipe 40, leading to and forming a part of any suitable injector, indicated conventionally at 41, for discharge into the boiler. The casing 38 is provided with recesses 42, 43 and 44, and journaled in said casing is a valve 45 having a diametric port 46, and a curved or nozzle port 47 communicating with port 46.

Assuming that steam having performed work in the low pressure cylinders, enters pockets 9 thereof at a pressure greatly below that of boiler pressure, it passes thence into pipe 14 and, if the valve 45 is set, as shown in Fig. 10, it will be injected into the boiler, as when the valve is thus positioned, steam from the boiler passes through pipe 39, recess 43 and nozzle 47 into pipe 40 and creates a suction or pull for injecting the steam at low pressure in pipe 14, into the boiler.

By proper adjustment of valve 45, it will be seen that only a small volume of steam need be permitted to pass from the boiler to pipe 39 and nozzle 47, to effect the injection of the low pressure steam into the boiler, the pipe 14 being equipped with a steam gage 48 which will indicate the pressure in said pipe and thus show the engineer when the volume of steam passing through pipe 39 is more or less than is necessary to effect the injection referred to.

If inspection of the gage shows boiler pressure, the engineer knows that he is simply circulating steam from the boiler by way of pipe 39, passage 47, pipe 40 and the injector, and is not accomplishing the injection of steam from pipe 14 into the boiler, in fact is wasting such steam, as instead of entering pockets 9, it is carried around in the low pressure cylinders and escapes through pipe 16 into the exhaust pipe 13.

From the above description it will be apparent that I have produced a locomotive embodying the features of advantage enumerated as desirable in the statement of the object of the invention, and I wish it to be understood that I do not desire to be restricted to the exact details of construction shown and described as obvious modifications will suggest themselves to one skilled in the art.

I claim:

1. In a power driven vehicle having a plurality of drivers, one of which is located in advance of another, a plurality of rotary motors, one of which is connected with each driver and each of which is provided with a valve for admitting a motive agent thereto, and a further valve common to all of the motors for controlling the supply of motive agent to the motors and constructed to supply the same individually and collectively.

2. In a power-driven vehicle having a plurality of drivers, one of which is located in advance of another, a plurality of rotary motors, each of which is connected with a driver, individual feed valves for the motors having means for intermittently admitting the motive agent to each motor cylinder, and a further valve common to all of the motors for controlling the supply of motive agent individually and collectively thereto.

3. In a power-driven vehicle having a plurality of drivers, one of which is located in advance of another, a plurality of rotary motors, each of which is connected with a driver, individual feed valves for the motors having means for intermittently admitting the motive agent to each motor cylinder and including chambers alternately and independently in communication respectively with the source of supply and the motor cylinder, and a further valve common to all of the motors for controlling the supply of motive agent individually and collectively thereto.

4. In a power-driven vehicle having a plurality of drivers, one of which is located in advance of another, a plurality of rotary motors, each of which is connected with a driver, individual feed valves for the motors having means for intermittently admitting the motive agent to each motor cylinder, and a further valve having ports in communication respectively with the casings of the first named valves and in communication with the motor exhaust ports for controlling the supply of motive agent individually and collectively to said motor valve casings and said exhaust ports.

In testimony whereof I affix my signature, in the presence of two witnesses.

ALFRED PETERSON.

Witnesses:
 HELEN C. RODGERS,
 G. Y. THORPE.

---

Copies of this patent may be obtained for five cents each, by addressing the "Commissioner of Patents, Washington, D. C."